United States Patent [19]
Jackson

[11] Patent Number: 5,143,321
[45] Date of Patent: Sep. 1, 1992

[54] FOLDING PROTECTIVE COVER FOR TURBO-ENGINES

[75] Inventor: Thomas H. Jackson, 7939 Ridgegate West Dr., Indianapolis, Ind. 46268

[73] Assignee: Thomas H. Jackson, Indianapolis, Ind.

[21] Appl. No.: 756,349

[22] Filed: Sep. 9, 1991

[51] Int. Cl.⁵ .............................................. B64D 33/00
[52] U.S. Cl. .................................. 244/536; 244/121; 60/39.092
[58] Field of Search ............................ 244/536, 121; 60/39.092; 55/306; 415/121.2

[56] References Cited

U.S. PATENT DOCUMENTS

| | | | |
|---|---|---|---|
| 1,123,491 | 1/1915 | Corbin | 415/121.2 |
| 2,846,023 | 8/1958 | Millman | 55/306 |
| 2,928,497 | 3/1960 | Stockdale | 415/121.2 |
| 4,077,739 | 3/1978 | Heilenbach | 60/39.092 |
| 4,149,689 | 4/1979 | McDonald | 60/39.092 |
| 4,833,879 | 5/1989 | Vercluyn et al. | 60/39.092 |

Primary Examiner—Joseph F. Peters, Jr.
Assistant Examiner—Virna Lissi Mojica

[57] ABSTRACT

The present invention is a folding protective cover primarily for openings which are generally circular in shape, particularly the air inlet and exhaust ducts of a stopped turbo-engine as used by aircraft. The invention is comprised of a generally circular ring shaped frame which is made up of four arc shaped sections of approximately 90 degrees each. Three hinges are mounted between the sections in such a manner that the frame may be folded into an arc of approximately 90 degrees. Affixed to the outer edge of the frame is a resilient gasket and affixed across the center of the frame is a waterproof fabric panel.

3 Claims, 7 Drawing Sheets

FOLDING PROTECTIVE COVER FOR TURBO-ENGINES

BACKGROUND OF THE INVENTION

1. Field of the Invention

The present invention is a folding protective cover primarily for openings which are generally circular in shape. More specifically, this invention relates to protective equipment with the function of covering air inlet and exhaust ducts of a stopped turbo-engine as used by aircraft.

2. Description of Related Art

Turbo-engines used on aircraft are vulnerable to damage from foreign objects which are sucked through the engine. In order to minimize the possibility of such an occurrence, it is desirable to cover the air inlet and exhaust openings when the engine is not operating. This reduces the likelihood of foreign matter accumulating in the engine ducts and causing damage upon start up. Typical examples of foreign matter which may accumulate are frozen precipitation, bird nests, wind blown debris, and insects.

For engine inlet and exhaust ducts that are circular or nearly circular in cross section one of the most common designs of engine cover is a rigid disk which is sized so that it may be wedged into the engine inlet or exhaust openings to function as a plug. The perimeter of the disk usually has some type of resilient gasket to promote sealing and provide better retention. A variation of this design is a disk which is hinged so that it may be folded in half for more compact storage. A latch is provided to lock the disk in the unfolded position. Another common approach for covering a turbo-engine is to use a pair of fitted fabric covers which are placed over each end of the engine nacelle and secured together by elastic cords extending from one cover to the other.

When used in the field problems with the above mentioned designs become apparent. Space onboard aircraft is at a premium and the rigid disk type covers are cumbersome to store and heavier than is desirable. Additionally, airports tend to be windy places and it can be difficult to handle the larger disk type engine covers in even moderate wind. This problem is exasperated by the fact that a ladder is usually needed to reach the height of the turbo-engine.

Fitted fabric type engine covers may require two people to install so that one end of the cover can be held in place while the other end is being positioned before connecting them together. Furthermore, fitted fabric type engine covers may require more volume to store than the rigid disk type unless they are neatly folded, a sometimes difficult task on a windblown ramp.

SUMMARY OF THE INVENTION

The present invention of the folding protective cover for turbo-engines overcomes the difficulties of previous designs by providing a cover which is light weight, convenient to use, and compact when folded. The invention is comprised of a generally circular ring shaped frame which is made up of four sections linked together by three hinges. The hinges provide means of folding said frame into a general arc shape of approximately 90 degrees. The end portions of the two sections of said frame which are not directly linked together by a hinge are provided with a means of latching together. A preferred embodiment of the invention uses a latch comprised of a plate extending from one frame section which may be inserted into a cavity in the corresponding section. Affixed to the outer edge of said ring shaped frame is a gasket composed of a resilient material such as rubber. Affixed across the center of said ring shaped frame is a waterproof fabric panel. Handles are affixed to the invention and means to retain the invention in the folded position is provided by a ribbon of fabric material.

In addition to the above mentioned design features, the invention folding protective cover for turbo-engines offers the following advantages over previous designs. The compact nature of the invention when folded makes it easier to handle and it need not be unfolded until just before installation. This eliminates the task of carrying large a disk up a ladder. No moving parts are required by the latch mechanism. The action of folding the invention is easier than fitted fabric type covers due to the hinged frame. The invention requires less force to firmly seat in a typical turbo-engine inlet duct than non-folding disk type covers.

DETAILED DESCRIPTION OF THE INVENTION

Figure 1:
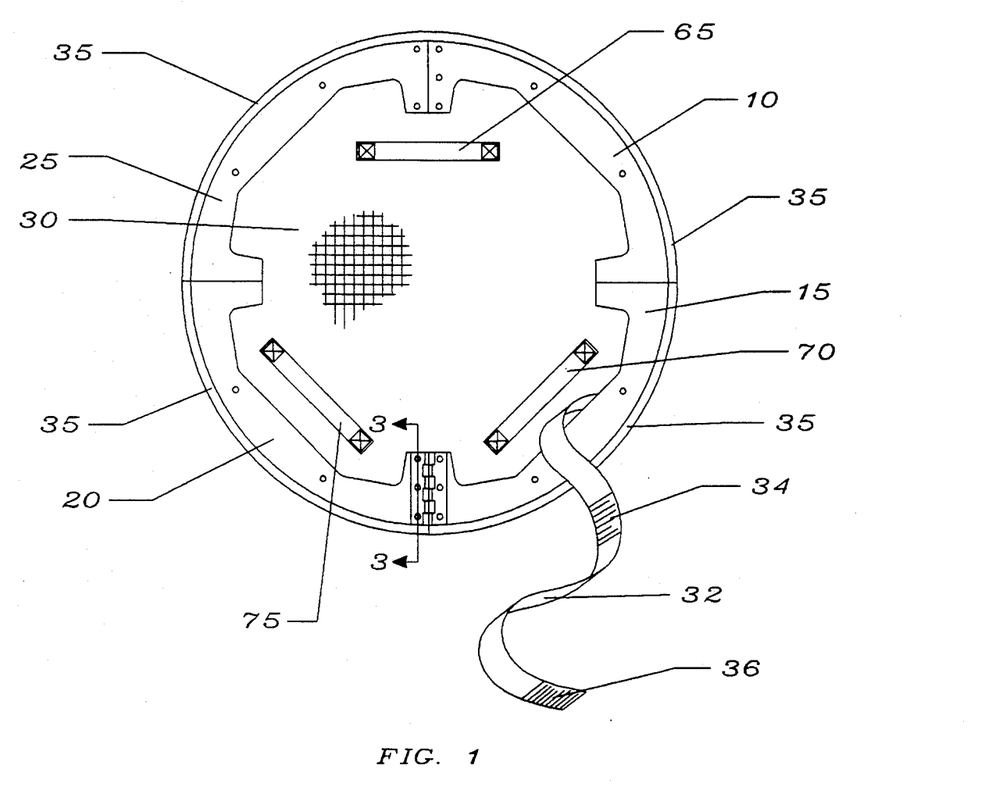
FIG. 1 is an elevational front view of the invention folding protective cover for turbo-engines showing the invention in the unfolded position.

Refer now to FIG. 1 which is a elevational front view of a preferred embodiment of the invention in the unfolded and latched position. The generally circular ring shape of the frame is illustrated. The frame is made up of four generally planar arc shaped curved sections and in the embodiment shown each section is comprised of a forward component and a aft component. The forward components of the said frame are denoted as items 10, 15, 20, and 25. A waterproof fabric material panel 30 is attached to each of the frame components.

A gasket 35 composed of a resilient material such as rubber is affixed to the outer perimeter of each frame component for the dual purposes of providing a sealing action and aiding retention of the invention when seated in its desired position for use. A ribbon of fabric material 32 is attached to one of the forward frame components with the primary purpose of enhancing visibility and therefore reducing the likelihood of the engine being accidentally started with the cover in place.

Figure 2:
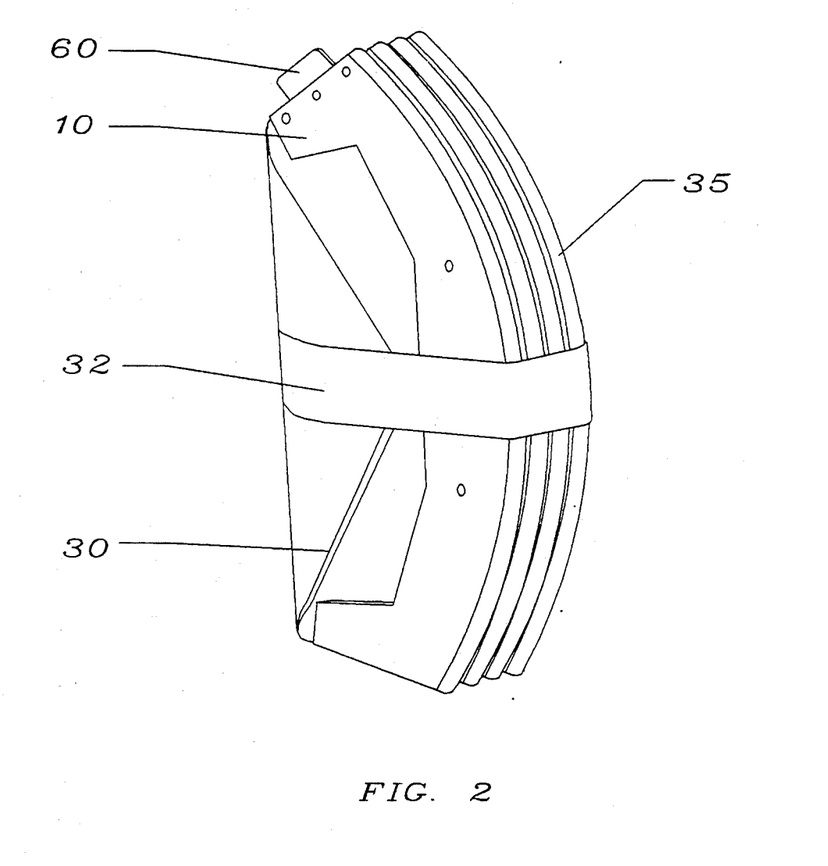
FIG. 2 is a perspective view of the invention in the fully folded position.

FIG. 2 is a perspective view of the invention in a fully folded position. The ribbon of fabric material 32 is shown wrapped around the folded protective cover to retain it in the folded position. The ribbon of fabric material 32 is secured to itself by sewn on hook and loop type fasteners which are shown respectively as items 34 and 36 of FIG. 1.

Figure 3:
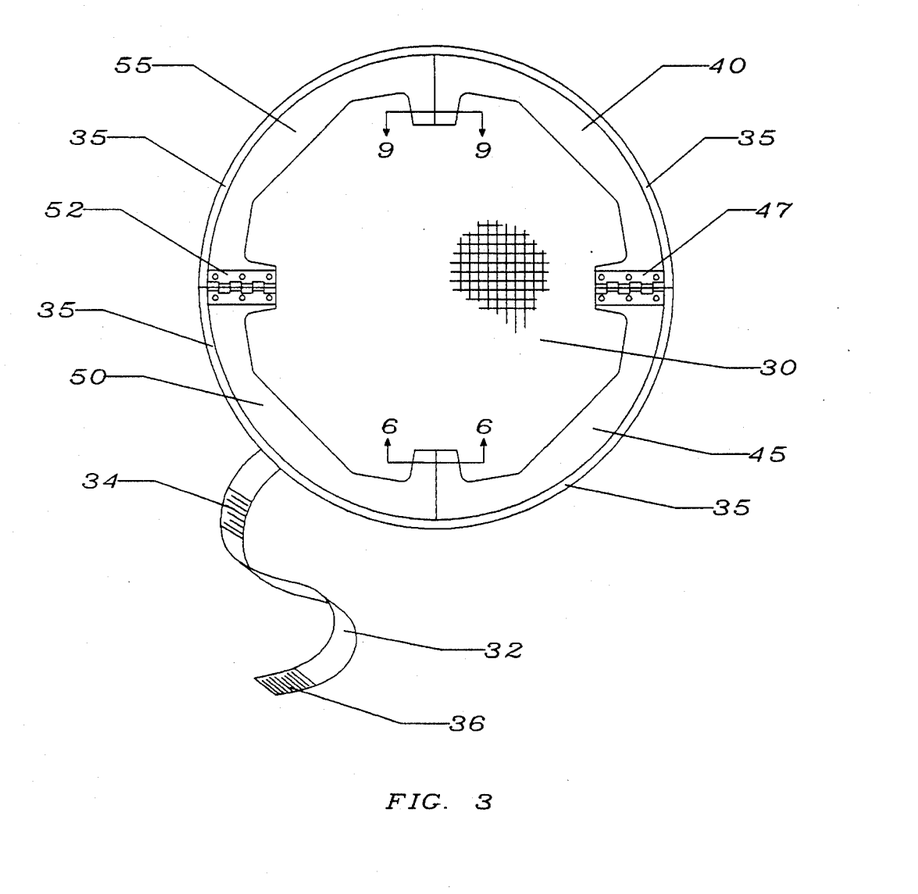
FIG. 3 is an elevational view of the back side of the invention in the unfolded position.

FIG. 3 is an elevational view of the aft side of the invention in the unfolded and latched position. Items 40, 45, 50, and 55 make up the aft frame components.

Figure 4:
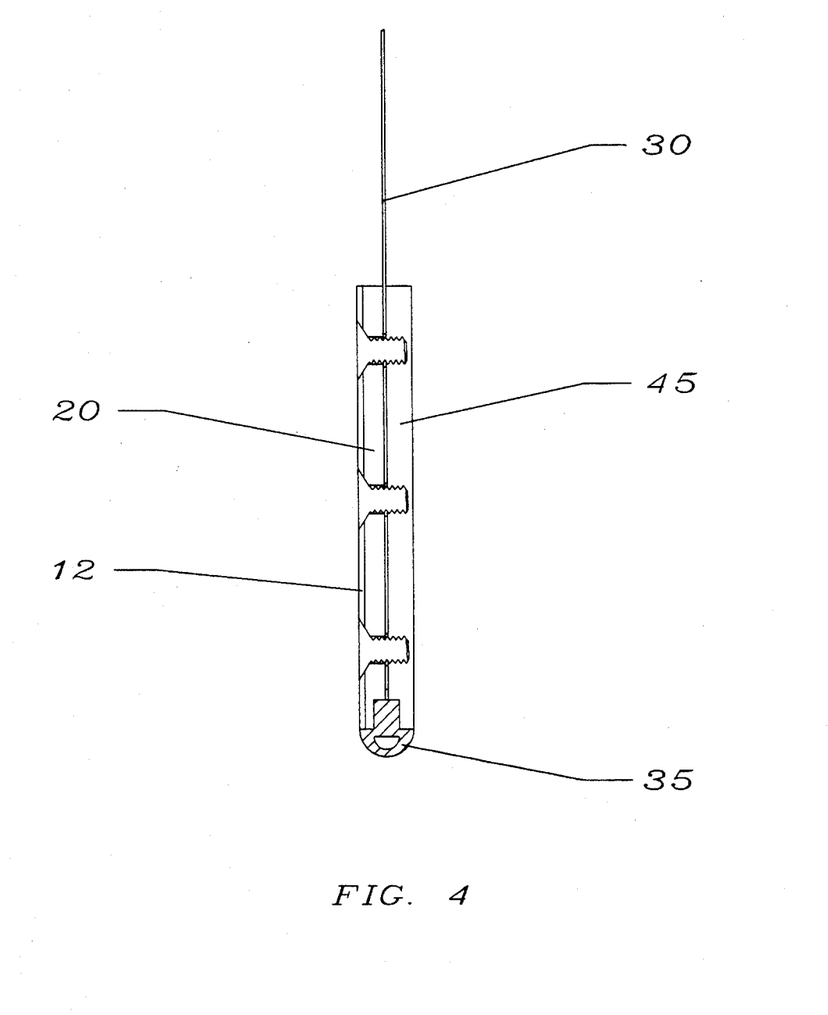
FIG. 4 is a sectional view taken along section lines 3—3 of FIG. 1.

FIG. 4 is a sectional view taken along section lines 3—3 of FIG. 1. Referring to FIG. 4, a preferred method of attachment of the fabric panel 30 and the gasket 35 to the frame of the invention is accomplished by clamping between the forward frame component 20 and the aft frame component 45.

Hinge 12 is mounted to the forward side of the invention as shown in FIG. 1 and hinges 47 and 52 are mounted to the aft side of the invention as shown in FIG. 2. The hinges are mounted to the end portion of the arc shaped frame components. This arrangement permits the generally circular ring shaped frame to be folded into the general shape of an arc of approximately 90 degrees.

Figure 5:
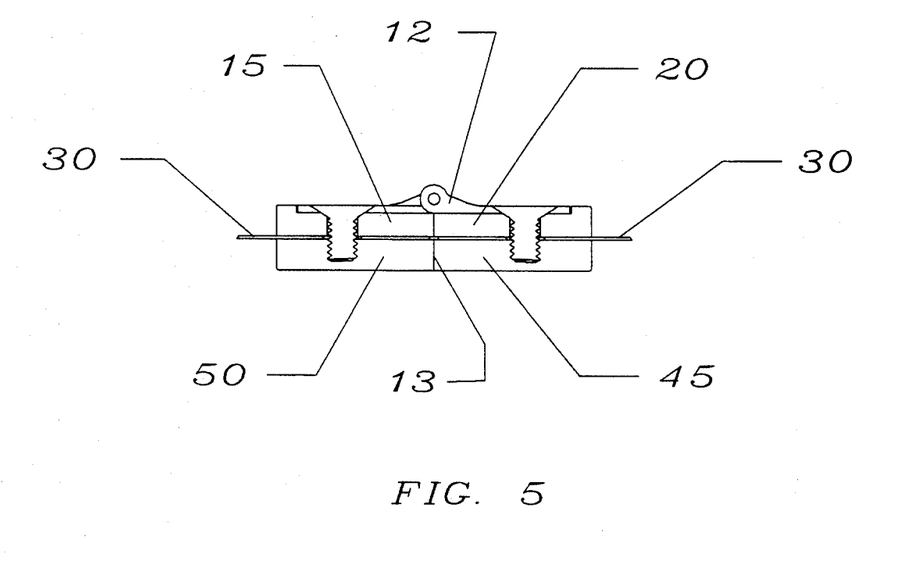
FIG. 5 is a sectional view taken along section lines 6—6 of FIG. 3 showing detail of the hinge mechanism.

Details of the hinge mounting are illustrated in FIG. 5 which is a cross-sectional view taken along section lines 6—6 of FIG. 3. In this preferred embodiment the hinge 12 is mounted to frame components 15, 20, 45, 50 by fasteners which also serve to clamp the frame components securely together over the fabric panel 30 and the gasket 35. When the invention is in the fully unfolded position the frame components adjacent to the hinges are in contact and further rotation about the axis of the hinge is prohibited. In this preferred embodiment the fully unfolded position of hinge 12 places the frame components 15 and 20 in a common plane. The preferred method of limiting the range of motion of the hinges is by adjusting clearance between the frame members in the location of the parting line 13 indicated in FIG. 5. The structures associated with hinges 47 and 52 per it approximately 185 degrees of rotation between frame components before said frame components come into contact. The advantage of this feature is that once the invention is firmly seated within a duct there is no tendency for inadvertent folding of the invention. Therefore, there is no need for a latch mechanism in order to secure hinges 47 and 52 in the fully open position.

Figure 6:
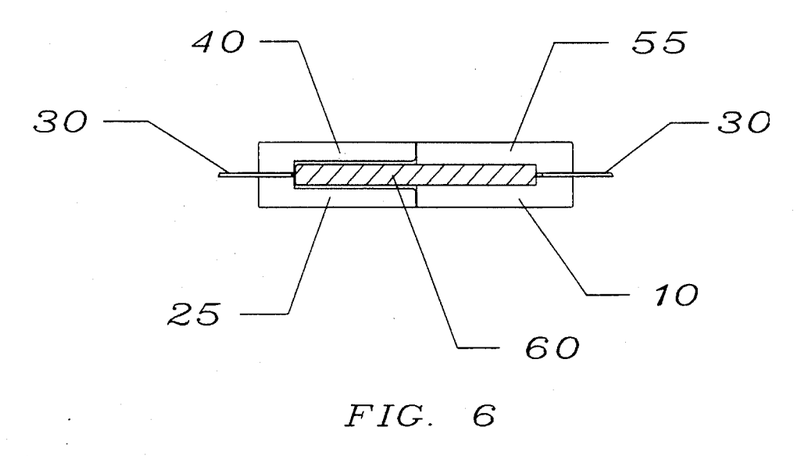
FIG. 6 is a sectional view taken along section lines 9—9 of FIG. 3 which shows detail of the latch structure.

FIG. 6 is a sectional view taken along section lines 9—9 of FIG. 3 showing detail of the latch structure which is comprised of frame components 10, 25, 40, 55, and plate 60. The plate 60 is securely attached to frame components 10 and 55. A recessed area on frame components 25 and 40 provides a cavity into which plate 60 may be inserted. In order to insert plate 60 into the aforementioned cavity the invention must be partially folded about hinges 47 and 52 so that rotation about the axis of hinge 12 will result in lateral movement of the latch structures. In this preferred embodiment, the fabric panel 30 is affixed to the frame components with enough excess fabric material in the center of the cover that the plate 60 can be moved fully out of the aforementioned cavity before the material is pulled tight. Similarly, there is enough excess material in the center of the cover that the action of folding the invention does not overly stretch the fabric panel 30.

Referring again to FIG. 1, handles 65, 70, and 75 are shown. In this particular embodiment of the invention the handles are made of woven fabric material and are sewn to the fabric panel 30. The location of handle 65 is such that a force pulling on the handle will tend to cause the plate 60 to stay fully seated within the associated cavity.

Figure 7:
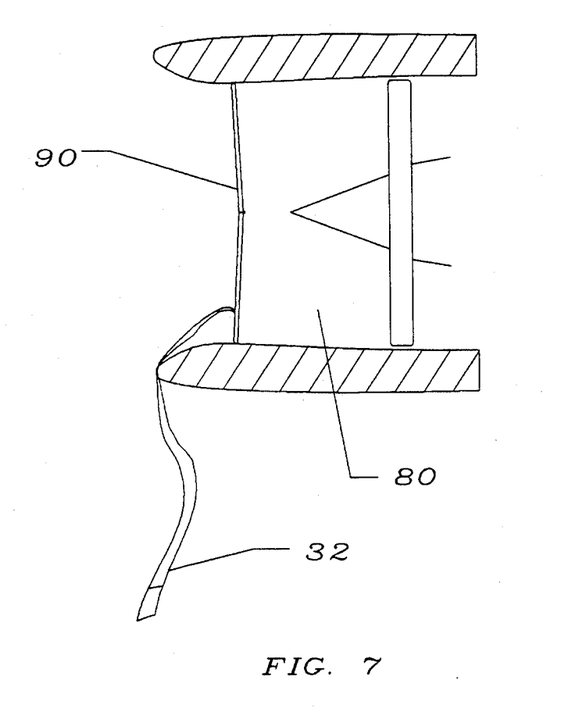
FIG. 7 is a partial cross-sectional view of a typical turbo-engine air inlet duct with the invention installed.

FIG. 7 is a partial cross-sectional view of a turbo-engine air inlet duct 80 with the invention folding protective cover for turbo-engines 90 installed. The typical convergent-divergent profile of a turbo-engine inlet duct 80 is shown. The ability of the invention to be folded allows the invention to be inserted past the point of the minimum diameter of the inlet duct in a partially folded position. The invention may then be fully unfolded and seated within the duct at a location along said duct where a minimum amount of effort is required to firmly seat the invention. This is advantageous because a typical turbo-engine air inlet duct has a much smaller angle of taper downstream of the point of minimum diameter.

The foregoing description of the preferred embodiment has been presented for the purpose of illustration and description. Many modifications and alternatives are possible within the spirit and scope of the invention. Alternative shapes such as generally square or rectangular folding protective covers are self-evident modifications to the invention of the generally circular folding protective cover for turbo-engines. It is intended that the scope of the invention not be limited by this detailed description, but rather by the claims appended hereto.

What is claimed is:

1. A folding protective cover for turbo-engines which is comprised of:
   a generally circular ring shaped frame comprised of four generally planar arc shaped curved sections which describe approximately 90 degrees of arc each and are pivotally linked by three hinges affixed to the end portion of said arc shaped curved sections thereby providing means of folding said frame into a general arc shape which describes approximately 90 degrees of arc;
   means for securely latching together the end portions of the two generally planar arc shaped curved sections of said generally circular ring shaped frame which are not affixed to a hinge;
   means for permitting two of said hinges which pivot on an axes perpendicular to that of the pivotal axis of the hinge which is opposite of said latching means to rotate through a range of approximately 185 degrees;
   a waterproof fabric material panel affixed across the center of said generally circular ring shaped frame;
   a gasket composed of a resilient material affixed to the outer perimeter of said generally circular ring shaped frame;
   a ribbon of fabric material having one end which is affixed to one section of said generally circular ring shaped frame in order to improve visibility and provide means of retaining the invention in the folded position;
   a plurality of handles affixed to said folding protective, cover for turbo-engines providing a means of grasping said folding cover.

2. A folding protective cover for use in ducts which are generally circular in cross section, particularly for air inlet and exhaust ducts of turbo-engines, which is comprised of:
   a generally circular ring shaped frame comprised of four generally planar arc shaped curved sections which describe approximately 90 degrees of arc each and are pivotally linked by three hinges affixed to the end portion of said arc shaped curved sections thereby providing means of folding said frame into a general arc shape which describes approximately 90 degrees of arc;

means for securely latching together the end portions of the two generally planar arc shaped curved sections of said generally circular ring shaped frame which are not affixed to a hinge;

means for permitting two of said hinges which pivot on an axes perpendicular to that of the pivotal axis of the hinge which is opposite of said latching means to rotate through a range of approximately 185 degrees;

a waterproof fabric material panel affixed across the center of said generally circular ring shaped frame;

a gasket composed of a resilient material affixed to the outer perimeter of said generally circular ring shaped frame;

a ribbon of fabric material having one end which is affixed to one section of said generally circular ring shaped frame in order to improve visibility and provide means of retaining the invention in the folded position;

a plurality of handles affixed to said folding protective cover providing a means of grasping said folding cover.

3. A folding protective cover for use in ducts, particularly for air inlet and exhaust ducts of turbo-engines, which is comprised of:

a perimeter frame comprised of four sections which are pivotally linked by three hinges affixed to the end portion of said sections thereby providing means of folding said perimeter frame into one quarter of the unfolded shape;

means for securely latching together the end portions of the two sections of said perimeter frame that are not affixed to a hinge;

means for permitting two of said hinges which pivot on an axes perpendicular to that of the pivotal axis of the hinge which is opposite of said latching means to rotate through a range of approximately 185 degrees;

a waterproof fabric material panel affixed across the center of said perimeter frame;

a gasket composed of a resilient material affixed to the outermost edge of said perimeter frame;

means of retaining the invention in the folded position;

a plurality of handles affixed to said folding protective cover providing a means to grasp said folding cover.

* * * * *